United States Patent Office 3,268,349
Patented August 23, 1966

3,268,349
STABILIZED ZIRCONIA COMPOSITION
Lothar H. Brixner, Brandywine Hills, Pa., assignor to E. I. du Pont de Nemours and Company, Wilmington, Del., a corporation of Delaware
No Drawing. Filed Oct. 20, 1964, Ser. No. 405,257
5 Claims. (Cl. 106—39)

This invention relates to zirconia-containing compositions which are stabilized against crystallographic phase change, and is more particularly directed to such compositions which are solid solution compositions of the generic formula $Ln_xNb_xZr_{1-2x}O_2$ in which Ln represents a metal selected from the group consisting of rare earth elements having atomic numbers 64 through 71, inclusive, and $x$ has a value of 0.015 to 0.15, inclusive.

Zirconia is an excellent refractory material because of its properties of high melting point (2700° C.), its low thermal conductivity (0.02 watts/cm.-deg.) and its chemical stability in oxidizing and reducing atmospheres. These properties make it of great interest as a high-temperature ceramic for such uses as furnace linings, ingot molds, crucibles, and piping where temperatures up to, say 2500° C., would be encountered. The major shortcoming of zirconia for such high temperature applications is that at a temperature of about 1100° C. it undergoes a reversible crystallographic phase change. At temperatures below about 1100° C., zirconia crystallizes in a monoclinic structure; above this temperature it crystallizes in a tetragonal structure. This crystallographic transition is associated with a 15% volume change, so that cracking and complete shattering of ceramic articles of pure zirconia results. It has been impossible therefore to employ this otherwise very valuable ceramic material for structural uses where the temperature cycle included the crystallographic transition point.

Various methods have been tried in the attempt to overcome this instability in zirconia and to produce a crystal structure which would be stable when temperature cycling in the range of 1000° to 1200° C. took place. So-called "stabilized" forms of zirconia are available commercially. These are generally solid solutions of CaO, (or of MgO or BaO, or combinations of these alkaline earth oxides) and zirconia. The alkaline earth oxide content is generally in the 16 to 30 mole percent range in these solid solutions. However, because of the difference in formula types in the alkaline earth oxides and the zirconia the resulting solid solution crystallizes in cubic symmetry and hence in an undesirable defect structure. Although these alkaline earth-stabilized zirconia refractories constitute a group of useful ceramic materials, they deteriorate slowly by destabilization and are quite sensitive to thermal shock due to large linear thermal expansion. Their uses as high temperature ceramics are therefore quite severly limited to certain temperature ranges and to applications which do not require cycling. It has been recognized that if zirconia could be stabilized in the tetragonal crystal form over a wide temperature range, a ceramic material would result which would be much superior to the defect structures formed with alkaline-earth oxides, but hitherto no pracitcal way to effect such stabilization has been known.

As an approach to the present invention it was first realized that an ideal way to stabilize the crystal structure of zirconia would be to form solid solutions of it with compositions of closely related structure and of identical formula type. Such crystallographic substitution would not result in a defect structure because all of the lattice sites would be occupied.

Now according to the present invention the stabilization of zirconia has been accomplished by the formation of solid solutions of it with rare-earth niobates of the generic formula $Ln^{+3}Nb^{+5}O_4$, where Ln represents yttrium or one of the rare earth elements of atomic number 64 through 71 of the Periodic Chart of the Elements. The transformation of monoclinic $YNbO_4$ to the tetragonal form occurs at 900° C.±20° and is not accompanied by disintegration of ceramic specimens. The present invention describes solid solutions of zirconia and certain rare earth and yttrium niobates in which the crystal structure does not undergo volume changes with thermal cycling between room temperature and 1200° C. to result in disintegration of the ceramic structure. The solutions have the formula $Ln_xNb_xZr_{1-2x}O_2$ where Ln is yttrium or a specified rare earth metal, and $x$ is from 0.015 to 0.05. When Ln is yttrium, a preferred value of $x$ is 0.04 and when Ln is Er, a preferred value of $x$ is 0.02.

Solid solutions of zirconia and yttrium niobate have been prepared over wide concentration ranges, and the quality of ceramic test bars prepared from these solid solutions has been checked through many thermal cycles encompassing the temperature range in which crystallographic transformation will show its detrimental effect, if this still exists. In general, the test bars were prepared by weighing out the constituent oxides in the stoichiometric quantities desired according to the following equation:

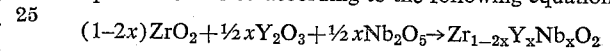

It is of course, entirely possible if desired, and within the scope of this invention, to form the $YNbO_4$ in a prior reaction according to the following equation:

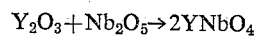

by simply heating together the component oxides.

The following examples will describe in detail the preparation and testing of the solid solutions of zirconia and certain rare earth niobates of this invention.

Example 1

A solid solution composition of the formula

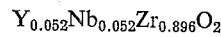

was prepared according to the following procedure:

10.0000 grams zirconium oxide, 0.5511 grams yttrium oxide, and 0.6488 grams niobium pentoxide were weighed out and charged into an agate mill. The oxide mixture was ground 30 minutes under acetone and subsequently dried. The dried powder mixture was then pressed into pellets 1″ in diameter under pressure of 25,000 to 30,000 p.s.i. The pellets were fired in a gas furnace in air at 1600° C. for about one hour. The pellets were then cooled, broken up, ground to pass a 100-mesh screen and pressed to form ceramic test specimens ¼″ x ¼″ x 2″. These specimens were subjected to a second firing at 1600° C. for about 1 hour.

One of the zirconia-stabilized ceramic bars prepared as described was analyzed by X-ray diffraction procedures and was found to be a single-phase composition showing none of the lines characteristic of the original oxides, $ZrO_2Nb_2O_5$, or $Y_2O_3$.

The ceramic bars thus prepared were tested for stability in thermal cycling for heating from room temperature to 1200° C. in a period of 20 minutes, removing from the furnace, and quenching in air for a period of 10 minutes. One such half-hour alternate heating and cooling period constitutes one thermal cycle. The ceramic bars of this example survived 50 thermal cycles without any evidence whatsoever that cracking had taken place, even on a microscopic scale. In contrast with this, a bar of the same measurement formed of zirconia disintegrated completely on the first thermal cycle. A commercial "stabilized zirconia" containing approximately 10% CaO became so weak and powdery that it crumbled on the application of the slightest pressure, whereas the YNbO$_4$-stabilized samples retained their original strength.

*Examples 2 through 15*

In the same manner as described in Example 1, other single-phase solid solution ceramic bars were prepared and tested, the amount of YNbO$_4$ used varying from 0.99 to 9.9% by weight based on composition of the solid solution produced. In each case, the oxides were carefully weighed to the 0.1 mg., ground together under acetone, pressed to pellets, heated to 1600° C. for 1 hour, cooled, reground, pressed again, and heated a second time to 1600° C. for 1 hour. By this procedure completely homogeneous test bars were prepared. The compositions prepared, the weights used and the test results are summarized in Table 1.

*Examples 16 through 18*

In the same manner as described in Example 1, other single-phase solid solution ceramic bars were prepared and tested. In these, compositions of the rare earth metal erbium was used, the amounts of the stabilizing niobate, ErNbO$_4$, in the compositions being 3.9 wt. percent, 5.2 wt. percent, 6.4 wt. percent. The compositions prepared, the weights of reactants used, and the test results, are included in Table 1.

weight and 10.7% by weight based on the composition of product are effective in stabilizing zirconia by forming solid solutions therewith, it is desirable from an economic standpoint to use as small an amount of the rare earth or yttrium niobate as possible to achieve the desired stable crystal structure. Solid solutions having as little as 0.015 mole of yttrium or of rare earth metals listed above and 0.015 mole of niobium substituted for zirconium— that is, solid solutions of formula Ln$_{0.015}$Nb$_{0.015}$Zr$_{0.97}$A$_2$, exhibit a stabilized crystal structure.

I claim:

1. A solid solution composition of generic formula Ln$_x$Nb$_x$Zr$_{1-2x}$O$_2$ in which Ln represents a metal selected from the group consisting of rare earth elements having atomic numbers 64 through 71 inclusive and yttrium, and $x$ has a value of 0.015 to 0.15 inclusive.

2. A solid solution composition of chemical formula Y$_x$Nb$_x$Zr$_{1-2x}$O$_2$ in which $x$ has a value of 0.015 to 0.15 inclusive.

3. A solid solution composition of chemical formula Y$_{0.04}$Nb$_{0.04}$Zr$_{0.92}$O$_2$.

4. A solid solution composition of chemical formula Er$_x$Nb$_x$Zr$_{1-2x}$O$_2$ in which $x$ has a value of 0.015 to 0.15 inclusive.

5. A solid solution composition of chemical formula Er$_{0.02}$Nb$_{0.02}$Zr$_{0.96}$O$_2$.

TABLE 1.—ZrO$_2$ STABILIZED WITH YNbO$_4$ OR RARE EARTH NIOBATES

| Example | Solid Solution Composition | Grams of Oxides Per 10 Grams ZrO$_2$ | | Weight Percent YNbO$_4$ Product | No. of Thermal Cycles to Failure |
|---|---|---|---|---|---|
| | | Y$_2$O$_3$ | Nb$_2$O$_5$ | | |
| 2 | ⎫ | 0.5052 | 0.5948 | 9.9 | Survived 30 cycles of 1,200° C. to room temp. without any evidence of cracking. |
| 3 | ⎪ | 0.4593 | 0.5407 | 9.1 | Do. |
| 4 | Y$_{0.05}$Nb$_{0.05}$Zr$_{0.90}$O$_2$ | 0.4134 | 0.4866 | 8.2 | Do. |
| 5 | ⎬ | 0.3674 | 0.4326 | 7.4 | Do. |
| 6 | ⎪ | 0.3215 | 0.3785 | 6.5 | Do. |
| 7 | ⎪ | 0.2756 | 0.3244 | 5.6 | Do. |
| 8 | ⎭ | 0.2296 | 0.2704 | 4.8 | Do. |
| 9 | ⎫ | 0.1837 | 0.2163 | 3.9 | Do. |
| 10 | Y$_{0.02}$Nb$_{0.02}$Zr$_{0.96}$O$_2$ | 0.1608 | 0.1892 | 3.4 | Do. |
| 11 | ⎬ | 0.1378 | 0.1622 | 2.9 | Do. |
| 12 | ⎭ | 0.1148 | 0.1352 | 2.4 | Do. |
| 13 | | 0.0919 | 0.1081 | 1.96 | Very fine cracks developed after 15 cycles. |
| 14 | Y$_{0.015}$Nb$_{0.015}$Zr$_{0.97}$O$_2$ | 0.0689 | 0.0811 | 1.48 | Slight cracking after 10 cycles but no further degradation after the succeeding 20 cycles. |
| 15 | | 0.0459 | 0.0541 | 0.99 | Do. |
| | | Er$_2$O$_3$ | Nb$_2$O$_5$ | | |
| 16 | Er$_{0.015}$Nb$_{0.015}$Zr$_{0.97}$O$_2$ | 0.2400 | 0.1668 | 3.9 | All survived 30 cycles of 1,200° C. to room temperature without any evidence of cracking. |
| 17 | Er$_{0.02}$Nb$_{0.02}$Zr$_{0.96}$O$_2$ | 0.3234 | 0.2247 | 5.2 | Do. |
| 18 | Er$_{0.025}$Nb$_{0.025}$Zr$_{0.95}$O$_2$ | 0.4085 | 0.2839 | 6.4 | Do. |

The examples which have been given of the stabilization of zirconia have used Y$_2$O$_3$ and Er$_2$O$_3$ as the stabilizing components of the LnNbO$_4$ (Ln being the rare earth metal or yttrium). However, oxides of the other rare earth metals, such as lutetium, ytterbium, and thulium, have been used in place of Y$_2$O$_3$, to effect stabilization because the tetragonal elementary cells of these niobates are of the same magnitude as LnNbO$_4$, where Ln is erbium or yttrium, and because of the complete solubility of up to 40 weight percent of these rare earth niobates with the tetragonal zirconia structure. Other rare earth elements which may be used in smaller quantities as stabilizers are the oxides of the rare earth elements holmium, dysprosium, terbium and gadolinium.

Although the above examples show that amounts of YNbO$_4$, or of ErNbO$_4$ between the levels of 2% by

References Cited by the Examiner

UNITED STATES PATENTS

| 2,937,102 | 5/1960 | Wagner | 106—57 |
| 2,956,327 | 10/1960 | Borel et al. | 252—62.9 |
| 3,153,179 | 10/1964 | Koenig et al. | 106—39 |
| 3,175,919 | 3/1965 | Smoot et al. | 106—57 |

FOREIGN PATENTS

| 874,882 | 8/1961 | Great Britain. |

TOBIAS E. LEVOW, *Primary Examiner.*

HELEN M. McCARTHY, *Examiner.*

J. E. POER, *Assistant Examiner.*